United States Patent
Imafuku et al.

[11] Patent Number: 5,965,630
[45] Date of Patent: Oct. 12, 1999

[54] SOFT CONTACT LENS WITH HIGH MOISTURE CONTENT AND METHOD FOR PRODUCING THE SAME

[75] Inventors: Suguru Imafuku; Soichiro Motono; Hidetoshi Iwamoto, all of Tokyo, Japan

[73] Assignee: Hoya Corporation, Tokyo, Japan

[21] Appl. No.: 08/905,347

[22] Filed: Aug. 4, 1997

[30] Foreign Application Priority Data

Aug. 5, 1996 [JP] Japan .................................. 8-205794

[51] Int. Cl.⁶ ...................................................... G02C 7/04
[52] U.S. Cl. ........................... 523/106; 523/108; 264/1.1; 264/2.6; 524/548; 524/555; 524/558; 524/916
[58] Field of Search ..................... 264/2.6, 1.1; 523/106, 523/108; 524/548, 555, 558, 916

[56] References Cited

U.S. PATENT DOCUMENTS

| | | | |
|---|---|---|---|
| 3,699,089 | 10/1972 | Wichterle . | |
| 4,680,336 | 7/1987 | Larsen et al. | 524/916 |
| 4,866,148 | 9/1989 | Geyer et al. | 523/106 |
| 4,889,664 | 12/1989 | Kindt-Larsen et al. . | |
| 5,039,459 | 8/1991 | Kindt-Larsen et al. . | |

FOREIGN PATENT DOCUMENTS

| | | |
|---|---|---|
| 0 182 659 | 12/1984 | European Pat. Off. . |
| 0 256 139 | 2/1986 | European Pat. Off. . |
| 0 453 231 A2 | 4/1990 | European Pat. Off. . |
| 0 642 039 A2 | 7/1993 | European Pat. Off. . |
| A 4-110311 | 4/1992 | Japan . |
| B2 4-49093 | 8/1992 | Japan . |
| A 6-289331 | 10/1994 | Japan . |
| BG 2 097 805 | 11/1982 | United Kingdom . |

*Primary Examiner*—Andrew E. C. Merriam
*Attorney, Agent, or Firm*—Griffin, Butler, Whisenhunt & Szipl, LLP

[57] ABSTRACT

A method for producing moisture-containing soft contact lenses by polymerizing monomers for contact lenses in the presence of a diluent for monomers and substituting the diluent contained in the resulting polymer with an aqueous solution, wherein the diluent is composed of one or more compounds selected from the group consisting of triethylene glycol, diethylene glycol monomethyl ether and triethylene glycol monomethyl ether and a moisture-containing contact lens composed of a copolymer of the following main components, (1) two or more kinds of hydrophilic monomers selected from the group consisting of 2-hydroxyethyl methacrylate, N-vinyl-2-pyrrolidone and N,N-dimethylacrylamide, (2) an alkyl methacrylate and (3) a crosslinkable monomer, and an aqueous solution, which has a moisture content of 50–70% and exhibits a penetration strength of 1100 gf/mm or more. The contact lens of the present invention is optically transparent and exhibit excellent mechanical strength.

8 Claims, No Drawings

SOFT CONTACT LENS WITH HIGH MOISTURE CONTENT AND METHOD FOR PRODUCING THE SAME

BACKGROUND OF THE INVENTION

1. Field of the Invention

The present invention relates to a highly moisture-containing soft contact lens with a moisture content as high as 50–70% and a method for producing it. More precisely, it relates to a method for producing moisture-containing contact lenses with high moisture content by polymerizing a monomer solution in the presence of a diluent which can be substituted with water, physiological saline or the like and substituting the diluent contained in the resulting polymer with water, physiological saline or the like to afford a moisture-containing contact lense with high moisture content, which method can afford moisture-containing contact lenses with high moisture content exhibiting, in particular, excellent transparency and high mechanical strength.

2. Related Art

Soft contact lenses are recognized to have good wear feeling because of the flexibility of the material from which they have been made. In particular, it is said that soft contact lenses with a higher moisture content can exhibit better wear feeling. However, moisture-containing soft contact lenses with high moisture content generally show poor mechanical strength and hence their handling is disadvantageously difficult.

Soft contact lenses are generally produced by the cutting and polishing method, i.e., cutting and polishing a piece of copolymer into a lens shape and swelling the lens shape copolymer with water. However, it is not easy to improve the production yield of lenses meeting the required specification in the cutting and polishing method because the copolymer is likely to absorb atmospheric moisture during the processing. Further, in addition to the above problem, the cutting and polishing method comprises a number of steps requiring operation preciseness such as the steps of cutting and polishing the base curve, the front curve and the edge of lenses and therefore it is not suitable for the production of contact lenses in a large scale.

On the other hand, as a method for producing contact lenses not requiring cutting and polishing and hence suitable for large scale production, the cast polymerization method utilizing a mold for producing contact lenses has been known. However, the polymerization in a mold having a small volume used for this method is affected and inhibited at the interface of the mold and monomer material by oxygen molecules absorbed on the mold, and thus mechanical strength and/or transparency of the lenses may be degraded. In particular, white turbidity may be caused. Moreover, when moisture-containing soft contact lenses of high moisture content are produced by this method, it is difficult to precisely control lens parameters due to large elongation of the lens material during the lens swelling process.

Under the circumstance described above, a method which utilizes the cast polymerization and, besides, can produce moisture-containing soft contact lenses of high moisture content with stable lens parameters has also been used recently. In this method, lens monomers are polymerized in the presence of a diluent not inhibiting the polymerization of the monomers and the diluent trapped in the resulting lenses is substituted with water, physiological saline or the like to afford contact lenses. In this method, swelling rate of the lenses can be suppressed and it becomes easy to precisely control the lens parameters.

For example, Japanese Patent Unexamined Publication No. Hei 6-289331 (referred to as "Reference 1" hereinafter) discloses a method for producing contact lenses by cast polymerization wherein hydrophilic monomers are polymerized in the presence of a water-soluble liquid selected from water, dioxane and dimethyl sulfoxide. It is recommended that the content of the water-soluble liquid in the polymerization mixture is 30–80 parts by weight per 100 parts by weight of copolymerizable monomers.

Japanese Patent Publication No. Hei 4-49093 (referred to as "Reference 2" hereinafter) discloses a method for producing contact lenses by static casting wherein acrylic or methacrylic monomers are polymerized in the presence of a mixture comprising a boric acid ester which can be substituted with water. As the boric acid ester, boric acid ester of glycerol, sorbitol, propylene glycol, mixtures thereof and the like are exemplified.

According to Japanese Patent Unexamined Publication No. Hei 4-110311 (referred to as "Reference 3" hereinafter), hydrophilic (meth)acrylate ester monomers of a predominant monomer ratio, alkyl methacrylate whose alkyl group contains at least four carbon atoms and crosslinkable monomer are polymerized by cast polymerization in the presence of a diluent which can be substituted with water to afford contact lenses. The diluent in this method is boric acid ester of dihydric alcohols.

In the U.S. Pat. No. 3,699,089 (referred to as "Reference 4" hereinafter), soft contact lens are produced by spin casting and hydrophilic monomers are polymerized in the presence of water or a water-miscible solvent. The water-miscible solvent used in this method is ethylene glycol, glycerol, dioxane and the like.

As seen from the above-mentioned References, the solvent or diluent is appropriately selected depending on the kinds of monomers in order to obtain contact lenses optically transparent and having good mechanical strength.

According to the research of the present inventors, however, it was extremely difficult to obtain contact lenses optically transparent and having good mechanical strength by polymerizing hydrophilic monomers and alkyl methacrylates in the presence of a diluent (solvent) and substituting the diluent when any one of the diluents used in the methods described in the above References is employed. All of the methods of the above References could afford only lenses optically opaque or having poor mechanical strength.

Therefore, an object of the present invention is to provide a moisture-containing soft contact lens of high moisture content which is composed of a polymer of hydrophilic monomers and alkyl methacrylates and optically transparent and exhibits excellent mechanical strength and a method for producing it.

SUMMARY OF THE INVENTION

Based on the above References, the present inventors have tried to develop a method for producing soft contact lenses of excellent transparency and high mechanical strength by casting polymerization, which is suitable for the production in a large scale. As a result, the present invention has been completed based on the finding that the above problems can be solved by using triethylene glycol, diethylene glycol monomethyl ether or triethylene glycol monomethyl ether as the diluent.

That is, the present invention provides a method for producing moisture-containing soft contact lenses by polymerizing monomers for contact lenses in the presence of a diluent for monomers and substituting the diluent contained in the resulting polymer with an aqueous solution, wherein the diluent is composed of one or more compounds selected from the group consisting of triethylene glycol, diethylene glycol monomethyl ether and triethylene glycol monomethyl ether.

DETAILED DESCRIPTION OF THE INVENTION

The method of the present invention is a method for producing moisture-containing soft contact lenses by polymerizing monomers for contact lenses in the presence of a diluent for monomers and substituting the diluent contained in the resulting polymer with an aqueous solution. Such a method for producing moisture-containing soft contact lenses utilizing a diluent per se has been known, and methods and conditions for polymerization, aqueous solution for substituting the diluent, substituting method and the like used in conventional methods may be also used as they are for the method of the present invention. The method will be detailed specifically hereinafter.

The method of the present invent on is characterized in that the diluent is composed of one or more compounds selected from the group consisting of triethylene glycol, diethylene glycol mnomethyl ether and triethylene glycol monomethyl ether.

By utilizing such in the contact lenses the diluent contained in the contact lenses after the polymerization is substituted with an aqueous solution such as water or physiological saline to afford moisture-containing contact lenses, swelling of lenses can be markedly suppressed and hence lens parameters can be uniformly and precisely controlled. Further, the diluent of the present invention can effectively absorb heat generated in molds upon the polymerization and therefore effective to obtain uniform contact lenses.

The diluent for monomers is preferably used in an amount of 20–40% by weight based on the total amount of the diluent for monomers and monomers for contact lenses. When the amount of the diluent for monomers is less than 20% by weight, it tends to become difficult to sufficiently suppress the swelling of moisture-containing contact lenses. When it exceeds 40% by weight, mechanical strength of resulting lenses may be deteriorated. The amount of the diluent is particularly preferably in a range of 25–35% by weight.

In the method of the present invention, the monomers for contact lenses preferably contain (1) two or more kinds of hydrophilic monomers selected from the group consisting of 2-hydroxyethyl methacrylate, N-vinyl-2-pyrrolidone and N,N-dimethylacrylamide, (2) an alkyl methacrylate and (3) a crosslinkable monomer as main components.

The hydrophilic monomers are used to control moisture content of contact lenses. In particular, contact lenses of high moisture content can be obtained by using two or more kinds of the hydrophilic monomers. The hydrophilic monomers are preferably used in an amount of 50–75% by weight based on the total amount of the diluent for monomers and the monomers for contact lenses. When the amount of the hydrophilic monomers is less than 50% by weight, it becomes difficult to obtain the desired highly moisture-containing soft contact lenses and, on the other hand, if it exceeds 75% by weight, mechanical strength of lenses tends to be deteriorated. The amount of the hydrophilic monomers is particularly preferably in the range of 55–70% by weight.

The alkyl methacrylate (referred to as "RMA" hereinafter) is used to improve mechanical strength of lenses. As RMA, for example, methyl methacrylate, ethyl methacrylate or the both can be used. RMA is suitably used in an amount of 3–20% by weight based on the total amount of the diluent for monomers and the monomers for contact lenses. When the amount of RMA is less than 3% by weight, mechanical strength of lenses cannot be sufficiently improved. If it exceeds 20% by weight, flexibility of lenses may be deteriorated and moisture-retaining property of lens surfaces may be deteriorated. The amount of RMA is particularly preferably in the range of 5–18% by weight.

The crosslinkable monomer is used for preventing deformation of contact lenses and improving mechanical strength thereof. The crosslinkable monomer is composed of one or more kinds of monomers selected from the group consisting of di(meth)acrylates of polyalcohols and monomers having at least one allyl group in each molecules. Examples of the di(meth)acrylate of polyalcohol include ethylene glycol di(meth)acrylate, diethylene glycol di(meth)acrylate, triethylene glycol di(meth)acrylate, trimethylolpropane tri(meth) acrylate and the like. Examples of the monomers having at least one allyl group in the molecules include, for example, allyl (meth)acrylate, diallyl maleate, diallyl phthalate, diallyl isophthalate, triallyl isocyanurate and the like. The term "(meth)acrylate" herein used is used to indicate acrylate and methacrylate.

These crosslinkable monomers are suitably used in an amount of 0.1–2% by weight based on the total amount of the hydrophilic monomers and the alkyl methacrylate. When the amount is less than 0.1% by weight, introduction of the crosslinkable monomers is not effective and, when it exceeds 2% by weight, lenses tends to become brittle and hence their physical properties may be deteriorated. The amount of the crosslinkable monomer is particularly preferably in the range of 0.25–1% by weight.

In the method of the present invention, for example, a polymerizable ultraviolet absorber for imparting UV absorbing property to lenses, polymerizable coloring agent for coloring lenses and the like may be further used as copolymerization components.

Examples of the polymerizable ultraviolet absorber include 5-chloro-2-[2-hydroxy-5-($\beta$-methacryloyloxyethylcarbamoyloxyethyl)]phenyl-2H-benzotriazole, 2-[2-hydroxy-5-($\beta$-methacryloyloxyethylcarbamoyloxyethyl)]phenyl-2H-benzotriazole, 5-chloro-2-[2-hydroxy-4-(p-vinylbenzyloxy-2-hydroxypropyloxy)]phenyl-2H-benzotriazole and the like.

Examples of the polymerizable coloring agent include 1,4-bis(4-vinylbenzylamino)anthraquinone, 1-p-hydroxybenzylamino-4-p-vinylbenzylamino-anthraquinone, 1-anilino-4-methacryloylaminoanthraquinone and the like. When contact lenses produced by the method of the present invention are colored, they may be colored by the vat dyeing method, not utilizing these polymerizable coloring agents. In the vat dyeing method, lenses are dyed by sufficiently impregnating the lenses with a leuco compound of dye in a vat dye bath and then immersing the lenses in an oxidation bath to convert the leuco compound to an oxidized compound and fix the dye.

Phthalocyanine dyes such as Alcian Blue 8GX and Alcian Green 2GX may also be used as a dye.

The polymerizable ultraviolet absorber and the polymerizable coloring agent is preferably used in an amount of less than 5% by weight, particularly preferably in the range of 0.02–3% by weight based on the total weight of the copolymerizable components in view of the fact that the effects of these components may be affected by the thickness of lenses. When the amount exceeds 5% by weight, mechanical strength of resulting contact lenses may be deteriorated and lenses may become unsuitable as soft contact lenses for practical use, which are brought into direct contact with living bodies, because of toxicity of the ultraviolet absorber and the coloring agent.

For producing soft contact lenses by the method of the present invention, a homogenous monomer solution is first prepared by adding a polymerization initiator to a mixture of the diluent and the monomers and sufficiently stirring the mixture. A radical polymerization initiator may be used as the initiator, and examples of such a radical polymerization initiator include common radical initiators, for example, peroxides such as lauroyl peroxide, cumene hydroperoxide and benzoyl peroxide, azobisvaleronitrile, azobisisobutyronitrile and the like. These initiators may be suitably used in an amount of 0.1–1% by weight based on the total amount of the hydrophilic monomers and the alkyl methacrylate.

The above monomer mixture is injected into a mold for contact lenses and then polymerized. The mold comprises combined molds having convex and concave curvatures and may be composed of metal, glass, resin or the like. However, it is preferably composed of a material exhibiting good releasability as to the resulting polymer, excellent solvent resistance and heat resistance. A mold made of a resin is preferred because such a mold can be easily produced into a shape required for desired lens design. The resin used for the mold is preferably selected from resins exhibiting small molding shrinkage, good surface transcription from metal molds, good dimensional precision and solvent resistance. Examples of such resin materials are polyethylene, polypropylene, polymethylpentene (TPX), polysulfone, polyphenylene sulfide, cyclic olefin copolymers such as "APL" (Mitsui Petrochemical Industries, Ltd., Japan) .and "Zeonex" (Nippon Zeon Co., Ltd., Japan), olefin maleimide copolymers and the like.

The inside of the mold is sufficiently evacuated to remove substances which may affect on the polymerization reaction such as moisture and oxygen, and purged with an inert gas such as nitrogen or argon. Then, the monomer mixture is injected into the mold. The injection of the monomer mixture is preferably carried out in an atmosphere of inert gas such as nitrogen or argon.

The polymerization can be performed, for example, by elevating the temperature continuously or stepwise in a temperature range of 25–120° C., and completed within 5 to 24 hours. It is desirable that the inside of polymerization furnace has an atmosphere of inert gas such as nitrogen or argon and the polymerization is preferably performed at atmospheric pressure or elevated pressure. By adding an photopolymerization initiator, the polymerization can be performed as photopolymerization caused by ultra-violet ray or visible light.

After completion of the polymerization, copolymer is taken out from the mold, and a moisture-containing contact lens is obtained by substituting the diluent contained in the copolymer with an aqueous solution. The aqueous solution used for substituting the diluent may be one usually contained in moisture-containing contact lenses and it may be, for example, water, physiological saline, preservation solution for soft contact lenses or the like. To efficiently remove the unpolymerized monomers and the diluent in the copolymer, the substitution may be performed first with an alcohol or alcohol/water mixture, which swells the copolymer to a higher degree than the aqueous solution, and then with the aqueous solution.

The present invention also provides a novel moisture-containing contact lens.

The moisture-containing contact lens of the present invention is a moisture-containing contact lens composed of a copolymer produced from monomers for contact lenses containing hydrophilic monomers, alkyl methacrylate and crosslinkable monomer as main components and an aqueous solution.

The hydrophilic monomers, the alkyl methacrylate and the crosslinkable monomer may be those already explained for the production method. The aqueous solution may also be those explained for the production method.

The moisture-containing contact lens of the present invention exhibits excellent mechanical strength of, for example, 1100 gf/mm (gram force per millimeter) or more of penetration strength, in spite of its high moisture content of 50–70%. Moisture content of the moisture-containing contact lens of the present invention is preferably 55–70% from a point of good wear feeling.

EXAMPLES

The present invention will be further explained with reference to the following examples, but the present invention is not limited to these examples.

Example 1

To a glass sample bottle of 100 ml volume, 18.75 g (37.5% by weight) of 2-hydroxyethyl methacrylate (abbreviated as HEMA hereinafter), 13.5 g (27% by weight) of N-vinyl-2-pyrrolidone (abbreviated as NVP hereinafter), 5.25 g (10.5% by weight) of ethyl methacrylate (abbreviated as EMA hereinafter), 12.5 g (25% by weight) of triethylene glycol (abbreviated as TEG hereinafter), 0.1875 g (0.5% by weight based on the total amount of HEMA, NVP and EMA) of diallyl maleate (abbreviated as DAM hereinafter) and 0.15 g (0.4% by weight based on the total amount of HEMA, NVP and EMA) of 2,2'-azobisisobutyronitrile (abbreviated as AIBN hereinafter) were introduced and stirred sufficiently to afford a monomer mixture. This monomer mixture was injected into a polypropylene mold having a shape of contact lens and polymerized in a nitrogen atmosphere at a pressure of 2 kgf/cm$^2$ in a temperature range of 25–110° C. for 15 hours. After completion of the polymerization, the resulting polymer was taken out from the mold and immersed into a large amount of distilled water to remove the diluent. Then, the polymer was immersed into physiological saline to afford a target contact lens. The obtained contact lens was transparent when it contained moisture, and exhibited good mechanical strength.

Physical properties of this contact lens were examined as follows. The results are shown in Table 1.

① Transparency

The contact lens was macroscopically observed in physiological saline at 25° C. and evaluated according to the following evaluation criteria.

Evaluation Criteria

A: Transparent

B: Slightly turbid in white

C: Strongly turbid in white

② Moisture content

Weight of the contact lens which had reached equilibration swelling after swelling by hydration in physiological saline at 25° C. (Ww) and weight of the contact lens after dehydration at 80° C. for four hours (Dw) were measured and moisture content was calculated according to the following equation:

Moisture content(%)={(Ww−Dw)/Ww}×100

③ Swelling rate

Diameter of the contact lens after the polymerization and before the substitution of the diluent (Dd) and diameter of the contact lens which had reached equilibration swelling after swelling by hydration in physiological saline at 25° C. (Wd) were measured and swelling rate was calculated according to the following equation:

Swelling rate(%)={(Wd−Dd)/Dd}×100

③ Penetration strength

A stainless steel penetration bar having a steel ball having a diameter of 1/16 inches on its end was installed on Instron Universal Material Tester Model 4310. Penetration load (g) upon break of the center part of the lens fixed in physiological saline at 25° C. was measured by the tester. The values in Table 1 are obtained by dividing the penetration load with the thickness of the center part of the lens (mm).

The thickness of the lenses used in the measurement was in a range of 0.10–0.12 (mm).

Examples 2 to 10

Contact lenses were obtained in a manner similar to that of Example 1 except that the compositions shown in Table 1 were used. The obtained contact lenses were transparent when they contained moisture, and exhibited good mechanical strength.

Comparative Example 1 (Japanese Patent Unexamined Publication No. Hei 6-289331 (Reference 1))

A contact lens was obtained in a manner similar to that of Example 1 except that dimethyl sulfoxide (abbreviated as DMSO hereinafter) was used as the diluent instead of TEG. The obtained contact lens exhibited lower mechanical strength compared to that of the contact lens obtained in Example 1.

Comparative Example 2 (Japanese Patent Unexamined Publication No. Hei 4-110311 (Reference 3))

A contact lens was obtained in a manner similar to that of Example 1 except that diethylene glycol ester of boric acid[1] (referred to as DEG borate hereinafter) was used as the diluent instead of TEG. The obtained contact lens exhibited severe white turbidity and could not be used for practical use.

[1] It was produced by reacting 82.2% by weight of diethylene glycol with 17.8% by weight of boric acid at a temperature of 80° C. in vacuum of 10 mmHg for 4 hours (Japanese Patent Unexamined Publication No. Hei 4-110311, Ester No. 21 in Table 2).

Comparative example 3 (Japanese Patent Publication No. Hei 4-49093 (Reference 2))

A contact lens was obtained in a manner similar to that of Example 1 except that glycerol ester of boric acid[2] (referred to as Gly borate hereinafter) was used as the diluent instead of TEG. The obtained contact lens exhibited severe white turbidness and could not be used for practical use.

[2] It was produced by reacting 73.5% by weight of glycerol with 26.5% by weight of boric acid of at a temperature of 80° C. in vacuum of 10 mmHg for 4 hours (Japanese Patent Unexamined Publication No. Hei 4-49093, the diluent of Example 2).

Comparative Example 4

A contact lens was obtained in a manner similar to that of Example 1 except that diethylene glycol (abbreviated as DEG hereinafter) was used as the diluent instead of TEG. The obtained contact lens exhibited lower mechanical strength compared to that of the contact lens obtained in Example 1.

Comparative Example 5 (U.S. Pat. No. 3,699,089 (Reference 4))

A contact lens was obtained in a manner similar to that of Example 1 except that ethylene glycol (abbreviated as EG hereinafter) was used as the diluent instead of TEG. The obtained contact lens exhibited lower mechanical strength compared to that of the contact lens obtained in Example 1.

Comparative Example 6 (U.S. Pat. No. 3,699,089 (Reference 4))

It was tried to prepare a monomer solution in a manner similar to that of Example 1 except that glycerol (abbreviated as Gly hereinafter) was used as the diluent instead of TEG. However, a uniform monomer solution could not be obtained because EMA and Gly were separated.

Comparative Example 7 (system containing no diluent)

To a glass sample bottle of 100 ml volume, 17.5 g (35% by weight) of HEMA, 25 g (50% by weight) of NVP, 7.5 g (15% by weight) of methyl methacrylate (abbreviated as MMA hereinafter), 0.25 g (0.5% by weight based on the total weight of HEMA, NVP and MMA) of DAM and 0.2 g (0.4% by weight based on the total weight of HEMA, NVP and MMA) of AIBN were introduced and sufficiently stirred to afford a monomer mixture. Then, a contact lens was obtained in a manner similar to that of Example 1. The obtained contact lens was slightly turbid in white and exhibited larger swelling and lower mechanical strength compared to those of the contact lens obtained in Example 1.

TABLE 1

| | Example | | | | | | | | | | Comparative Example | | | | | | |
|---|---|---|---|---|---|---|---|---|---|---|---|---|---|---|---|---|---|
| No. | 1 | 2 | 3 | 4 | 5 | 6 | 7 | 8 | 9 | 10 | 1 | 2 | 3 | 4 | 5 | 6 | 7 |
| HEMA | 37.5 | 37.5 | 41.25 | 41.25 | 37 | 37 | 32 | 32 | 30 | 32 | 37.5 | 37.5 | 37.5 | 37.5 | 37.5 | 37.5 | 35 |
| NVP | 27 | 27 | 28.5 | 28.5 | 28 | 28 | 28 | 28 | 20 | 6.4 | 27 | 27 | 27 | 27 | 27 | 27 | 50 |

TABLE 1-continued

| No. | Example 1 | 2 | 3 | 4 | 5 | 6 | 7 | 8 | 9 | 10 | Comparative Example 1 | 2 | 3 | 4 | 5 | 6 | 7 |
|---|---|---|---|---|---|---|---|---|---|---|---|---|---|---|---|---|---|
| DMAA | | | | | | | | | 10 | 25.6 | | | | | | | |
| MMA | | | | | 10 | 10 | 15 | 15 | 15 | 16 | | | | | | | 15 |
| EMA | 10.5 | 10.5 | 5.25 | 5.25 | | | | | | | 10.5 | 10.5 | 10.5 | 10.5 | 10.5 | 10.5 | |
| AMA | | | | | | | | | | 0.64 | | | | | | | |
| DAM | 0.5 | 0.5 | 0.5 | 0.5 | 0.5 | 0.5 | 0.5 | 0.5 | 0.5 | | 0.5 | 0.5 | 0.5 | 0.5 | 0.5 | 0.5 | 0.5 |
| AIBN | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 | 0.4 |
| TEG | 25 | | 25 | | 25 | | 25 | | | | | | | | | | |
| MTEG | | 25 | | 25 | | 25 | | 25 | | 20 | | | | | | | |
| MDEG | | | | | | | | | 25 | | | | | | | | |
| DSMO | | | | | | | | | | | 25 | | | | | | |
| DEG borate | | | | | | | | | | | | 25 | | | | | |
| Gly borate | | | | | | | | | | | | | 25 | | | | |
| DEG | | | | | | | | | | | | | | 25 | | | |
| EG | | | | | | | | | | | | | | | 25 | | |
| Gly | | | | | | | | | | | | | | | | 25 | |
| Transparency | A | A | A | A | A | A | A | A | A | A | A | C | C | A | A | — | B |
| Moisture content | 56 | 56 | 58 | 57 | 56 | 56 | 54 | 55 | 60 | 62 | 53 | — | — | 52 | 53 | — | 61 |
| Swelling rate | 21 | 19 | 24 | 23 | 22 | 21 | 20 | 20 | 27 | 31 | 21 | — | — | 21 | 22 | — | 39 |
| Penetration strength | 1780 | 1960 | 1430 | 1360 | 1500 | 1640 | 1740 | 1870 | 1310 | 1160 | 705 | — | — | 945 | 957 | — | 915 |

As shown in Table 1, the contact lenses of Comparative Examples 1, 4 and 5 could exhibit only lower mechanical strength, while swelling was suppressed owing to the use of the diluent.

The contact lenses of Comparative Example 2 and 3 showed white turbidness and could not be used as practical contact lenses.

In Comparative Example 6, a uniform monomer mixture could not be prepared because the monomer and the diluent were separated.

The contact lens of Comparative Example 7 showed slight white turbidness and poor mechanical strength as well as large swelling because a diluent was not used.

On the other hand, all of the contact lenses of Examples 1 to 10 were transparent and their swelling was suppressed compared to the system containing no diluent (Comparative Example 7). Further, they showed a penetration strength of 1100 gf/mm or more, i.e., high mechanical strength. This effect was obtained by using the specific solvent, in particular, triethylene glycol, diethylene glycol monomethyl ether or triethylene glycol monomethyl ether, as the diluent.

The contact lenses of the present invention have high moisture content and show excellent transparency as well as high mechanical strength. In addition, they can be advantageously produced by cast polymerization, which is suitable for industrial scale production, according to the production method of the present invention.

What is claimed is:

1. A method for producing moisture-containing soft contact lenses, comprising the steps of:

polymerizing a mixture comprising (1) 50–75% by weight of two or more hydrophilic monomers selected from the group consisting of 2-hydroxyethyl methacrylate, N vinyl-2-pyrrolidone and N,N-dimethylacrylamide, (2) 3–20% by weight of an alkyl methacrylate, (3) a cross-linking monomer, and (4) a diluent consisting essentially of one or more constituents selected from the group consisting of triethylene glycol, diethylene glycol monomethyl ether and triethylene glycol monomethyl ether; and substituting an aqueous solution for the diluent.

2. A method for producing moisture-containing soft contact lenses, comprising the steps of:

polymerizing a mixture comprising (1) 50–75% by weight of two or more hydrophilic monomers selected from the group consisting of 2-hydroxyethyl methacrylate, N vinyl-2-pyrrolidone and N,N-dimethylacrylamide, (2) 3–20% by weight of an alkyl methacrylate, (3) a cross-linking monomer, and (4) a diluent consisting essentially of one or more constituents selected from the group consisting of triethylene glycol, diethylene glycol monomethyl ether and triethylene glycol monomethyl ether; and substituting an aqueous solution for the diluent and wherein the cross-linking monomer comprises one or more monomers selected from the group consisting of diacrylates of polyalcohols and monomers having at least one allyl group in each molecule and wherein the alkyl methacrylate is methyl methacrylate and/or ethyl methacrylate.

3. A method for producing moisture-containing soft contact lenses, comprising the steps of:

polymerizing a mixture comprising (1) 50–75% by weight of two or more hydrophilic monomers selected from the group consisting of 2-hydroxvethyl methacrylate, N vinyl-2-pyrrolidone and N,N-dimethylacrylamide, (2) 3–20% by weight of an alkyl methacrylate, (3) a cross-linking monomer, and (4) a diluent consisting essentially of one or more constituents selected from the group consisting of triethylene glycol, diethylene glycol monomethyl ether and triethylene glycol monomethyl ether; and substituting an aqueous solution for the diluent and wherein the monomers contain 0.1–2% by weight of the cross-linking monomer based on the total amount of the hydrophilic monomers and the alkyl methacrylate and wherein the alkyl methacrvlate is methyl methacrylate and/or ethyl methacrylate.

4. The method according to claim 2 wherein the monomers for contact lenses contain 0.1–2% by weight of the crosslinkable monomer based on the total amount of the hydrophilic monomers and the alkyl methacrylate.

5. The method according to claim 3, wherein the monomers for contact lenses contain 0.25–1% by weight of the crosslinkable monomer based on the total amount of the hydrophilic monomers and the alkyl methacrylate.

6. A moisture-containing soft contact lens made by a method comprising the steps of:

polymerizing a mixture comprising (1) 50–75% by weight of two or more hydrophilic monomers selected from the group consisting of 2-hydroxyethyl methacrylate, N vinyl-2-pyrrolidone and N,N-dimethylacrylamide, (2) 3–20% by weight of an alkyl methacrylate, (3) a cross-linking monomer, and (4) a diluent consisting essentially of one or more constituents selected from the group consisting of triethylene glycol, diethylene glycol monomethyl ether and triethylene glycol monomethyl ether; and substituting an aqueous solution for the diluent to produce a moisture-containing soft contact lens.

7. A contact lens according to claim 6, wherein said mixture is injected into a mold and copolymerized to afford a polymer in the form of a contact lens.

8. A contact lens according to claim 6, having a penetration strength of 1100 gf/mm or more, and a moisture content of 50–70%.

* * * * *